April 9, 1963 W. S. BLANDING ETAL 3,084,614
COFFEE MAKER
Filed Dec. 1, 1959 2 Sheets-Sheet 2
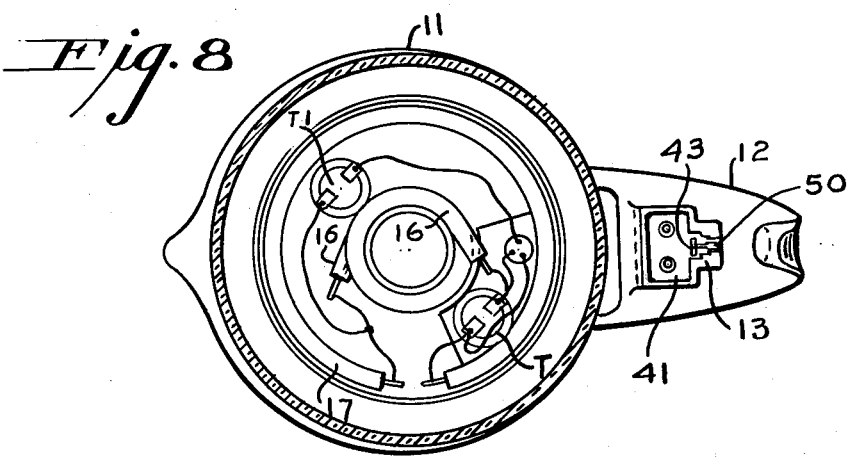
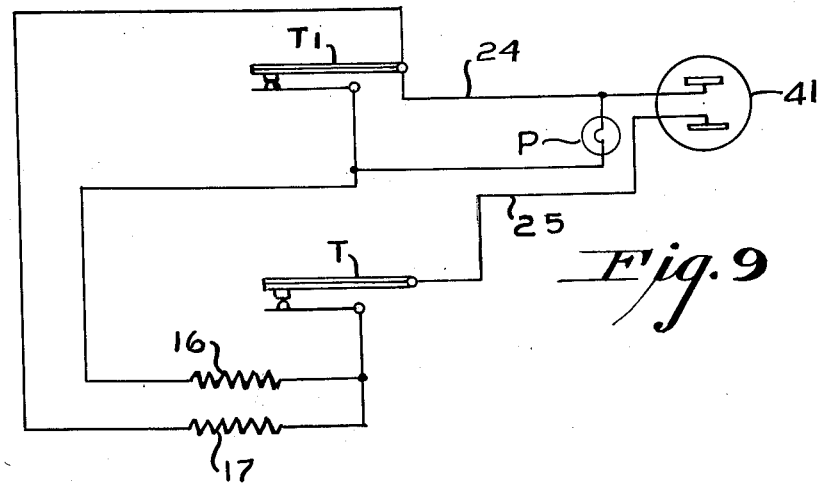
INVENTORS
WENDELL S. BLANDING
AND JOHN F. FRAZIER
BY Clarence R. Oatley, Jr.
ATTORNEY

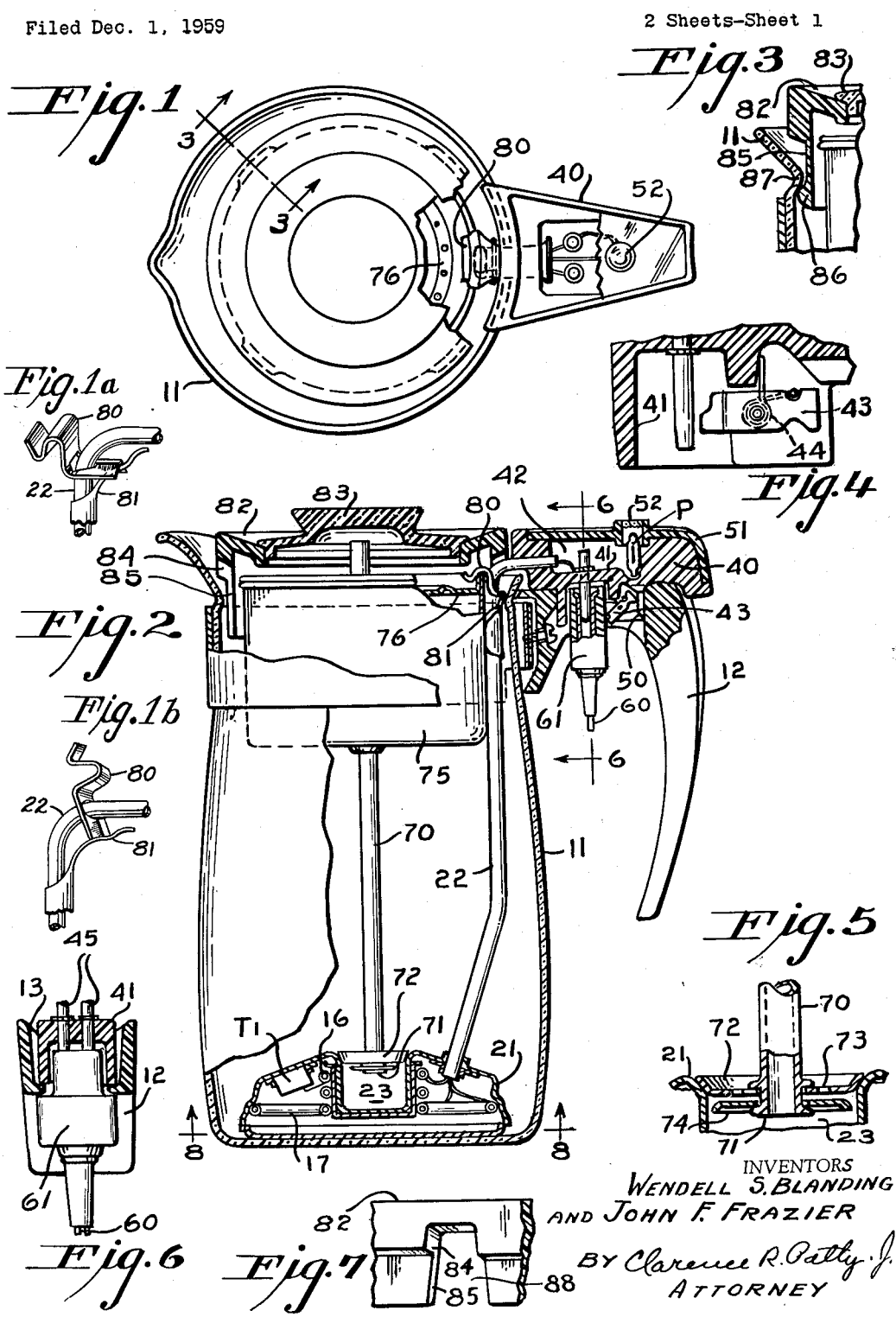

United States Patent Office 3,084,614
Patented Apr. 9, 1963

3,084,614
COFFEE MAKER
Wendell S. Blanding and John F. Frazier, Painted Post, N.Y., assignors to Corning Glass Works, Corning, N.Y., a corporation of New York
Filed Dec. 1, 1959, Ser. No. 856,535
11 Claims. (Cl. 99—285)

The present invention relates in general to coffee makers and more particularly, to coffee makers of the electrically heated type arranged for automatic operation.

A principal aim of the invention is to provide an improved form of coffee maker of the percolator type which is fully automatic in operation.

A further aim of the invention is a coffee maker embodied in an assembly whose respective operating parts of which can be fully immersed for thorough cleaning.

The invention also includes such features as an attractive brewing vessel of ceramic material that may be employed separately as a liquid server, or may be selectively employed in conjunction with an exterior heat source or its own heating elements for culinary uses other than coffee brewing.

More specifically, according to the invention, a handled serving vessel having a removable cover, embodies thermostatically controlled brewing and brew temperature maintaining elements housed within a container adapted for introduction into the interior of the vessel and a coffee brewing pump and an associated ground coffee basket that are separable from such container. Within the container, one of two thermostats is arranged to open the circuit of the brewing element and to effect the lighting of a pilot light and another thermostat is arranged to open a current supply line common to both elements should the container attain an excessive temperature, as during dry operation of the coffee maker. Moreover, the arrangement is such that operating potential can only be supplied to the heating elements after the container is appropriately arranged within the vessel.

For a thorough understanding of the invention reference is made to the accompanying drawings wherein:

FIG. 1 is a top plan view of an assembly embodying the invention, with certain parts broken away.

FIGS. 1a and 1b are perspective views showing a latch detail of the assembly in its alternative positions.

FIG. 2 is a side view of the same with certain parts broken away.

FIG. 3 is an enlarged fragmentary view taken on line 3—3 of FIG. 1.

FIGS. 4, 5 and 7 are fragmentary views on an enlarged scale illustrating particular details of the assembly.

FIG. 6 is an enlarged fragmentary view taken on line 6—6 of FIG. 2.

FIG. 8 is a view taken on line 8—8 of FIG. 2.

FIG. 9 is a wiring diagram.

Referring to the drawings in detail, the numeral 11 designates a brewing vessel, preferably of ceramic material, and provided with a handle 12 having a vertical passage 13 therethrough, best illustrated in FIG. 6.

Provided for arrangement within the vessel 11 is a closed container 21, housing a high wattage heating element 16 surrounding a pump well 23 embodied in the top side of the container for effecting percolation. A relatively low wattage heating element 17 closely surrounded by the container side wall is provided for supplying heat to maintain the brew at a desired usable temperature. Also within container 21 is a thermostat TI (FIGS. 2, 8 and 9) provided to open the circuit of element 16 and to permit lighting of a pilot light P, shown in FIGS. 2 and 9, at the end of a brewing cycle. A thermostat T (FIGS. 8 and 9) is provided to disconnect the common terminals of elements 16 and 17 from a current source at a higher temperature that may be created in the absence of fluid in the vessel or should thermostat T have failed to operate as intended. As will be observed, the container 21 is fixed to the lower end of a heating element conductor tube 22 whose upper end terminates within a cavity 42 in a housing 40 associatable in juxtaposed relation with the handle 12. Cavity 42 also has arranged within it the pilot light P and terminals 45 (FIG. 6) of a plug receptacle 41 embodied in the housing 40. After suitable electrical connections have been made between the pilot lamp P and conductor 24 (FIG. 9) and between conductors 24 and 25 and the terminals 45, cavity 42 is sealed to external atmosphere by cementing a cover 51 thereover. An appropriate lens 52 embodied in the cover is arranged immediately over the pilot light P.

The portion of housing 40 comprising plug receptacle 41 is appropriately shaped to nest in or occupy the handle passage 13 when the container 21 is properly positioned with vessel 11, as in FIG. 2.

As best illustrated in FIG. 4, embodied in the housing 40 adjacent to receptacle 41 is a pivoted plug lockout member 43 biased, by a spring 44, to a position that normally blocks introduction of a plug into the receptacle. A boss 50 (FIGS. 2 and 8) in the handle passage 13 (FIGS. 7 and 8) is adapted to engage and move member 43 out of such path as receptacle portion 41 of the housing 40 is nested in the handle passage. A cord 60 for use with the coffee maker embodies a plug 61 whose entrance end may be introduced into handle passage 13 and on into the receptacle 41, but whose cord end is of such dimensions as to prevent it being passed through the handle passage, as indicated in FIG. 6. The handle, thus serves as a means for disconnecting the plug from the receptacle when the housing 40 is removed from the handle if the operator has failed to do so prior to the removal of the container 21 from the vessel 11.

The coffee brewing pump employed comprises a tube 70 having an intake end 71 adapted for introduction into the well 23. As will be noted from FIG. 5, the intake end 71 has arranged thereabout a saucer-like disc 72 that practically closes the top opening of well 23, and is provided with an annular row of apertures 73 through which fluid in the vessel may readily enter the well. A disc 74, loosely arranged below disc 72, is adapted to be raised by steam pressure generated within the well to close apertures 73 and thus initiate pumping or percolation even while fluid in the vessel is still at a low temperature. Tube 70, near its upper or delivery end, supports a coffee basket 75 provided with a conventional spreader plate 76. To securely hold the basket 75 centered with respect to vessel 11, a manually operable latch 80 is associated with tube 22 adjacent housing 40. Latch 80 is resiliently retained alternatively in latching position over the upper end of basket 75 and over the spreader plate 76, or in a position away therefrom, by a leaf spring 81 one end of which is clamped about and rigidly attached to tube 22 between which and the spring the latch is pivotally embraced.

A vessel cover comprises a ring 82 of resilient plastic having embodied in its center a glass knob 83. A relatively thick depending wall portion 84 of the ring is adapted to rest upon the flared mouth bordering portion of the vessel 11. Also, a relatively thin further depending wall portion 85 of the ring gives the necessary resiliency thereto for bosses such as 86 thereof to be forced past a restriction 87 (FIG. 3) below the flared mouth bordering portion of the vessel to firmly hold the cover in place thereon. The cover is also provided with passages such as 88 (FIG. 7), through two opposite sides of the depending wall portions 84 and 85 to provide spaces for the free passage of fluid from the vessel and for the latch 80, respectively, when the cover is in place.

As depicted in FIG. 9, a conductor 24, extends from one terminal of the receptacle 41, to one of the terminals of a thermostat TI and heating element 17 respectively. A conductor 25 extends from the other terminal of the receptacle to one terminal of thermostat T, and whose other terminal is connected to the common terminals of heating elements 16 and 17 respectively. Pilot light P is bridged across the terminals of thermostat TI and is accordingly normally shunted.

When the receptacle 41 is connected with a current source, circuits for heating elements 16 and 17 are completed. These circuits extend over conductor 25, through thermostat T to the common terminals of elements 16 and 17, through element 16 and thermostat TI in series to conductor 24 and directly through the heating element 17 to the conductor 24. Thus it will be seen that both elements 16 and 17 are energized.

When percolation has been effected thermostat TI opens the heating circuit through element 16 and removes the shunt from about pilot light P.

Should the heating elements be energized without fluid present in the vessel 11, or should the fluid therein be entirely consumed, the thermostat T will ultimately function to open the common path portion of the circuits through elements 16 and 17 to prevent possible damage to the assembly.

To use the coffee maker, the cover is removed from the vessel as is the entire inside assembly. An amount of water is then introduced into the vessel in accordance with the number of cups of coffee desired and the inside assembly replaced. The spreader plate is then removed from the coffee basket, ground coffee placed therein, the spreader plate replaced, the cover placed on the vessel, and the current supply plug introduced into the plug receptacle.

As hereinbefore pointed out, when percolation has been completed the thermostat TI removes the shunt from about pilot light P which lights up to indicate that the coffee is ready for serving. Coffee may be served from the vessel without the necessity of removal of the coffee basket and pump assembly, or then may be first removed if preferred.

To disassemble the coffee maker, the plug 61 is withdrawn from receptacle 41 and the vessel cover removed. The housing 40 may then be grasped and the entire inside assembly lifted out. Alternatively the latch 80 may be first disengaged from the basket 75 and the latter and the pump removed before removing the remainder of the inside assembly. As previously indicated, all parts of the assembly (excluding the cord) may be immersed for thorough cleaning.

What is claimed is:

1. In an electric percolator, a brewing vessel, a heating element container arranged within said vessel having a pump well therein, a heating element conductor tube extending from said container to a position exterior of said vessel, a pump projected into such well, a ground coffee basket carried by said pump at its delivery end, a housing exterior of the vessel into which the tube projects, a plug receptacle embodied in said housing to terminals of which conductors issuing from said tube are connected, and a handle for the vessel having a passage therethrough into one end of which the portion of said housing comprising a plug receptacle projects and available to a plug via the other end of such passage.

2. An electric percolator as in claim 1, which includes a power supply cord having a plug introduced into said plug receptacle via the other end of such passage, and means for preventing introduction of said plug into said receptacle when such portion of said housing does not occupy said handle passage.

3. An electric percolator as in claim 2, wherein said plug has a portion engageable by the passage bordering portion of said handle to obstruct passing of the plug through such passage upon disassociation of said housing from the handle.

4. In an electric coffee maker, a handled brewing vessel, a closed container within the vessel having a wall forming a well therein, an upstanding pump supported by said container having its intake end projected into such well, a ground coffee basket carried by said pump at its delivery end, an electric heating element within said container, a housing occupying a passage in such handle having embodied therein a plug receptacle for the heating element, a tubular member connecting the interior of said container and housing and accommodating the necessary electrical connections between said heating element and said receptacle respectively, and a cover for said vessel having a passage through which said tube passes.

5. A coffee maker, as in claim 4, wherein a pilot light is embodied in said housing and circuit controlling means for the heating element and pilot light embodied in said container.

6. In a vessel, a heating element comprising a closed container for placement in the vessel, a tube extending from said container to a region exterior of the vessel, a housing into which said tube projects having a depending portion embodying a plug receptacle, a handle for the vessel having a passage therethrough occupied by said receptacle, conductors extending through said tube connected to the heating element and to said plug receptacle respectively, and a current attachment plug occupying said receptacle and the passage of said handle.

7. A vessel as in claim 6 wherein there is means carried by said housing for normally preventing introduction of said plug into said receptacle and means embodied in the handle for actuating said means to make the plug accessible to said receptacle when the receptacle occupies the handle passage.

8. A vessel as in claim 6 having a vessel cover provided with a depending wall for frictional engagement with the inner surface of the mouth bordering wall portion of such vessel and having a passage through such wall for said tube.

9. In an article of manufacture, an electrical appliance embodying a device having a handle for convenience of its use, an electric heating element removably connected to said device having a plug receptacle occupying a passage through said handle, means carried by said receptacle normally blocking access to the receptacle of a plug having a cord at one end for attachment to an electrical outlet and means operative while the receptacle occupies said handle passage to disable said means.

10. An article as in claim 9 wherein the receptacle is occupied by a plug through a passage in the handle and a cord is provided having a plug whose dimensions prevent its advance through such passage while the receptacle occupies the handle passage whereby disassociation of said heating element from said device will effect disassociation of said plug from the receptacle.

11. An article of manufacture as in claim 9 wherein the plug occupies said receptacle through a passage in the handle and the cord end of the plug is of a greater cross sectional dimension than the passage, whereby removal of the plug from the receptacle is effected by disassociation of the electric heating element from the device.

References Cited in the file of this patent

UNITED STATES PATENTS

| 1,155,166 | Rose | Sept. 28, 1915 |
| 1,308,023 | Abtmeyer | July 1, 1919 |
| 1,359,390 | Kuhn | Nov. 16, 1920 |
| 2,754,399 | Edman | July 10, 1956 |
| 2,798,143 | O'Brien | July 2, 1957 |
| 2,817,743 | Foster | Dec. 24, 1957 |
| 2,851,578 | Sidell | Sept. 9, 1958 |

FOREIGN PATENTS

| 56,761 | Sweden | Nov. 11, 1922 |